US007298122B2

(12) United States Patent
Bernacchia et al.

(10) Patent No.: US 7,298,122 B2
(45) Date of Patent: Nov. 20, 2007

(54) ACTUATION CIRCUIT FOR A SWITCH REGULATING THE POWER CONSUMPTION IN A SWITCHING CONVERTER

(75) Inventors: Giuseppe Bernacchia, Padova (IT); Giorgio Chiozzi, Padova (IT); Giovanni Capodivacca, Padova (IT)

(73) Assignee: Infineon Technologies AG, Munich (DE)

( * ) Notice: Subject to any disclaimer, the term of this patent is extended or adjusted under 35 U.S.C. 154(b) by 253 days.

(21) Appl. No.: 11/211,381

(22) Filed: Aug. 25, 2005

(65) Prior Publication Data
US 2006/0061342 A1    Mar. 23, 2006

(30) Foreign Application Priority Data
Aug. 27, 2004    (EP) ................. 04020456

(51) Int. Cl.
*G05F 1/40*    (2006.01)
(52) U.S. Cl. ....................... 323/282; 323/285
(58) Field of Classification Search ............... 323/222, 323/223, 282, 283, 284, 285, 351
See application file for complete search history.

(56) References Cited

U.S. PATENT DOCUMENTS

| 5,705,919 | A | * | 1/1998 | Wilcox ............... 323/282 |
| 5,731,731 | A | * | 3/1998 | Wilcox et al. ............... 327/403 |
| 5,847,554 | A | * | 12/1998 | Wilcox et al. ............... 323/282 |
| 5,912,552 | A | * | 6/1999 | Tateishi ............... 323/285 |
| 6,166,528 | A | | 12/2000 | Rossetti et al. |
| 6,215,290 | B1 | * | 4/2001 | Yang et al. ............... 323/282 |
| 6,246,220 | B1 | | 6/2001 | Isham et al. |
| 6,377,034 | B1 | * | 4/2002 | Ivanov ............... 323/287 |
| 6,381,159 | B2 | | 4/2002 | Oknaian et al. |
| 6,580,258 | B2 | * | 6/2003 | Wilcox et al. ............... 323/282 |
| 6,642,697 | B2 | * | 11/2003 | Zuniga et al. ............... 323/223 |

OTHER PUBLICATIONS

Stengl, Jens Peer et al., "Power MOSFET Practice," Pflaum Verlag, ISBN 3-7905-0619-2, pp. 176 (1992).
Tarter, Ralph E., "Solid State Power Conversion Handbook," Wiley & Sons, Inc. ISBN 0-471-57243-8, pp. 350-351.
Yang, Zaohong, "DC-to-DC Buck Converters with Novel Current Mode Control," IEEE, pp. 1158-1164 (1999).
Tarter, Ralph E., "Solid State Power Conversion Handbook," Wiley & Sons, Inc. ISBN 0-471-57243-8, pp. 492-495 (1993).

* cited by examiner

*Primary Examiner*—Adolf Berhane
(74) *Attorney, Agent, or Firm*—Dicke, Billig & Czaja, PLLC

(57) ABSTRACT

An actuation circuit for a switch element regulating the power consumption of an inductive energy storage element in a switching converter, used to convert an input voltage into an output voltage, is described. The circuit includes a pulse width modulator circuit configured so as to provide a pulse-width-modulated actuating signal for the switch element depending on a regulating signal dependent on the output voltage and a current measurement signal dependent on a current across the inductive storage element. The circuit further includes an arrangement that provides the current measurement signal, wherein the arrangement for providing the current measurement signal is a measuring and regulating arrangement, configured so as to simulate the current measurement signal from a signal dependent on the output voltage, a signal dependent on the difference between the input voltage and the output voltage, and at least a first sampled value of a signal proportional to the current across the inductive storage element during a period of the pulse-width-modulated actuating signal.

20 Claims, 6 Drawing Sheets a)

b)

ACTUATION CIRCUIT FOR A SWITCH REGULATING THE POWER CONSUMPTION IN A SWITCHING CONVERTER

CROSS-REFERENCE TO RELATED APPLICATIONS

This Utility Patent Application claims priority to European Patent Application No. 04 020 456.2, filed on Aug. 27, 2004, which is incorporated herein by reference.

BACKGROUND

The present invention relates to an actuation circuit for a switch regulating the power consumption in a switching converter. In one case, a switching converter is configured as a buck converter.

Buck converters are switching converters (switched-mode converters) used to convert an input voltage into an output voltage that is lower in comparison to the input voltage. The fundamental layout of such buck converters is described, for example, in Stengl, J. P.; Tihanyi, J.: "Power MOS-FET Practice", 2nd Edition, Pflaum Verlag, Munich, page 176, or in Tarter, R. E.: "Solid-State Power Conversion Handbook", Wiley & Sons, New York, 1993, ISBN 0-471-57243-8, pages 350, 351.

An important element in such a buck converter is an inductive storage element, which is connected to a supply voltage and timed by a pulse width modulated actuating signal.

In order to regulate the output voltage to an approximately constant value, not depending on the current consumption of a load connected to the output terminals, a regulating arrangement is present in such switching converters, which detects the output voltage or the changes in the output voltage. If the output voltage deviates from a given nominal value, the power consumption of the buck converter is changed by changing the on-period, in order to regulate the output voltage back to the nominal value once again. For buck converters that work in so-called current mode control, in order to generate the pulse width modulated actuating signal, one uses the time course of the current across the inductance to generate the actuating signal. This time function, which approximately corresponds to a triangular signal function, is compared to a regulating signal that depends on the output voltage in order to determine the time for the start or end of an on-period. Either the end or the start of the on-period will usually be assigned a fixed time.

A buck converter with current mode operation is described, for example, in Tarter, op.cit., pages 492 to 495.

In such current mode buck converters (CM buck converters), the measuring of the current across the inductance causes problems. In particular, it is difficult to detect a current for which a measurement signal is available both when the switch is closed and when the switch is open, that is, during the entire course of an actuation period of the switch.

To measure the current across the inductance, one can use a measuring resistor connected in series with the inductance, and pick off the voltage across the resistor. However, the voltage across the resistor is related to a potential which varies greatly according to the operating state of the switch, which makes it difficult to evaluate the voltage across the shunting resistor. Furthermore, the power dissipated by this sense resistor is proportional to the square of the load current, therefore the overall efficiency of the converter is severely compromised at high currents.

SUMMARY

One embodiment of the present invention provides an actuator circuit for a switch regulating the power consumption of an inductive storage element in a switching converter that has a current measuring arrangement which provides a current measurement signal that is at least approximately proportional to the current across the inductive storage element during an entire actuation period of the switch.

In one embodiment of the invention, the actuation circuit for a switch element regulating the power consumption of an inductive energy storage element in a switching converter, which is used to convert an input voltage into an output voltage, has a pulse width modulator and a measuring and regulating arrangement. The pulse width modulator circuit is configured so as to provide a pulse-width-modulated actuating signal for the switch element dependent on a regulating signal, which is dependent on the output voltage, and a current measurement signal, which is dependent on a current across the inductive storage element. The measuring and regulating arrangement provides the current measurement signal, which is configured so as to simulate the current measurement signal from a signal depending on the output voltage, a signal depending on the difference between the input voltage and the output voltage, and at least a first sampled value of a signal proportional to the current across the inductive storage element during one period of the pulse-width-modulated actuating signal.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The actuation circuit according to one embodiment of the invention for a first switch T1 regulating the power consumption of an inductive energy storage element in a switching converter has a signal generating circuit 40, which provides a pulse-width-modulated actuating signal S1, and a measuring and regulating arrangement 20.

The measuring and regulating arrangement 20 is configured so as to simulate a current measurement signal Vc, which is at least approximately proportional to a current across the inductive storage element, from a single sampled value of an actually measured current signal Vs during an actuation period of the first switch T1 and from other known parameters. The current measurement signal Vc generated by the measuring and regulating arrangement 20 is therefore designated hereinbelow as the simulated current measurement signal Vc, while the signal Vs which is sampled in order to generate the single sampled value is designated the actual measurement signal.

Figure 1:
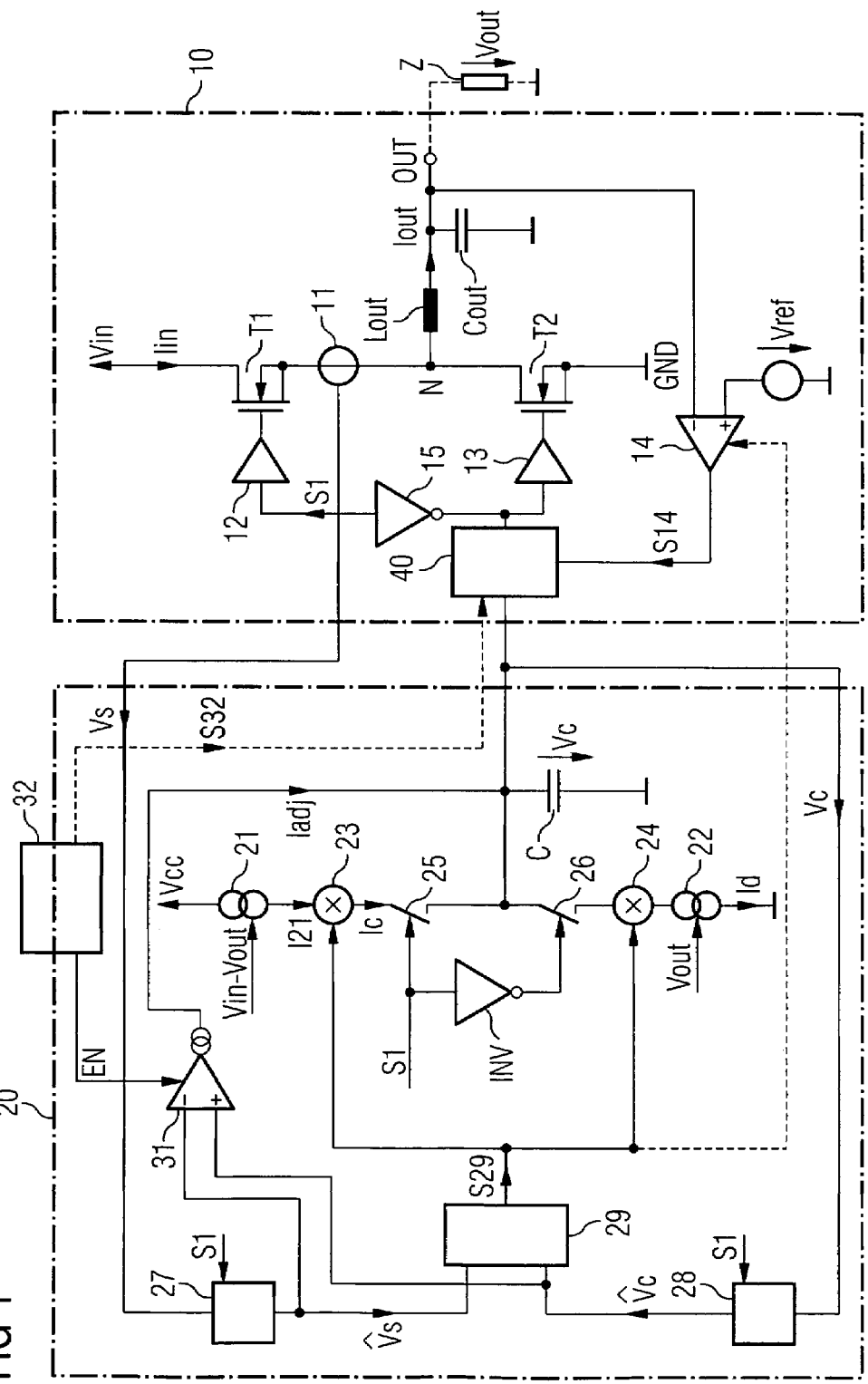
FIG. 1 illustrates a switching converter configured as a buck converter with an actuation circuit according to one embodiment of the invention.

For a better understanding of the functioning of this actuation circuit, FIG. 1 illustrates moreover the converter stage of a switching converter, which will be briefly explained hereinbelow. The converter stage, configured in the example as a buck converter stage, includes the first switch T1, actuated by the actuating signal S1 of the actuator circuit, and in series with the switch T1 the inductive storage element Lout, for example, a storage induction coil. The inductive storage element L forms, together with an output capacitor Cout connected in series with it, a low-pass filter, to furnish an output voltage Vout for a load which can be connected to the converter stage. Connection terminals of the output capacitor Cout form the output terminals of the converter stage.

Connected in parallel to the series circuit with the inductive storage element Lout and the output capacitor Cout is a freewheeling element T2. As the freewheeling element, which serves to take over the current across the inductance Lout after the blocking of the first switch T1, the example uses a second semiconductor switch T2, which is actuated in complementary fashion to the first semiconductor switch T1. In order to actuate the first semiconductor switch T1 by the actuator signal S1, a first driver circuit 12 is provided, which converts the level of the actuating signal S1 to a level suitable for actuating the first semiconductor switch T1.

The two semiconductor switches in the example are configured as n-channel MOSFETs. During operation, one must ensure that the two semiconductor switches T1, T2 are not simultaneously conducting. The actuating of the second semiconductor switch T2 likewise occurs in accordance with the actuating signal S1, which is inverted by means of an inverter 15 for the actuating of the second semiconductor switch. The output signal of the inverter is furnished to a second driver circuit, which converts the level of the signal at the output of the inverter to a level suitable for actuating the second switch T2.

An input voltage Vin is imposed on the converter stage across the series circuit, which includes the first switch T1 and the parallel circuit with the filter Lout, Cout, and the freewheeling element.

The represented converter stage functions as is briefly explained hereinbelow: Under pulse-width-modulated actuation of the first switch T1, a rectangular voltage relative to the reference potential GND is present at the junction node N between the first switch T1 and the inductance, whose amplitude varies between the value of the input voltage Vin and zero. This rectangular voltage is converted by the low-pass filter with the inductance Lout and the capacitor Cout into the approximately uniform output voltage Vout. The value of this output voltage Vout, for identical input voltage, can be adjusted via the keying ratio of the pulse-width-modulated signal S1. Given identical load and identical input voltage, the output voltage Vout will be larger according as the keying ratio (duty cycle) is larger. The duty cycle is defined in terms of the quotient of the on-period of the first switch T1 and the period duration of one actuation period.

Figure 4:
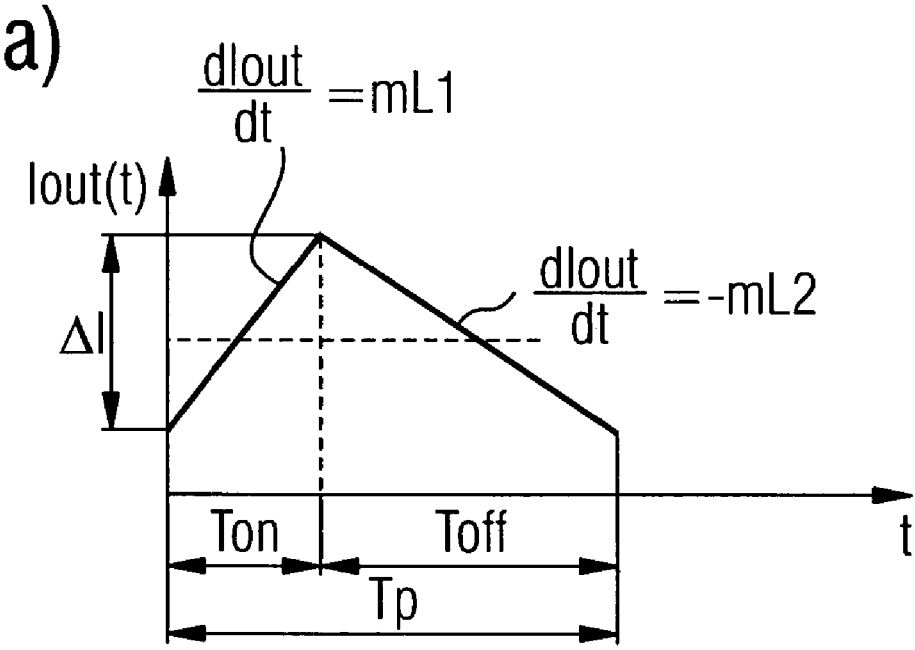
FIGS. 4a and 4b illustrate exemplary time plots of a current across the inductive storage element and the simulated current measurement signal during an actuation period of the switch.
Figure 4:
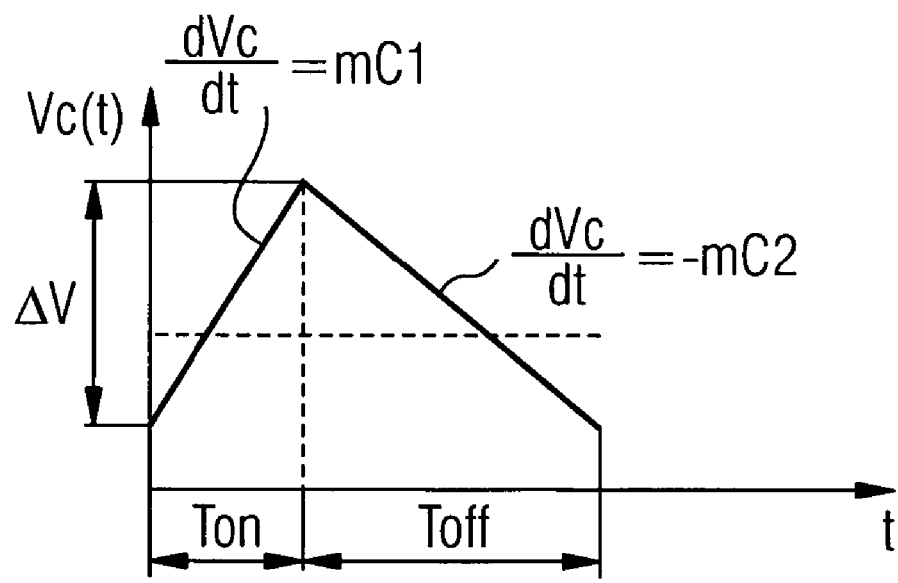

The current Iout flowing through the inductive storage element Lout has a triangular-shaped curve, as is represented by means of FIG. 4a for one actuation period. The current Iout rises when the first switch T1 is conducting during an on-period of duration Ton and decreases when the first switch is blocked during an off-period of duration Toff. When the first switch T1 is switched on, a voltage is present across the inductance Lout—disregarding switching losses in the first switch T1—corresponding to the difference between the input voltage Vin and the output voltage Vout. The time change (slope) of the rising current across the inductance is given by:

$$dIout/dt = (Vin - Vout)/Lout \text{ for } 0 \leq t \leq Ton \quad (1a).$$

When the first switch T1 is switched off and the freewheeling element T2 is conducting, the output voltage Vout is presented across the inductance Lout—disregarding switching losses in the freewheeling element T2. The time change (slope) for the now decreasing current Iout across the inductance is given by:

$$dIout/dt = -Vout/L \text{ for } Ton \leq t \leq Toff \quad (1b)$$

As is immediately apparent, by changing the duty cycle Ton/Tp, where Tp=Ton+Toff, one can change the mean current consumption and, thus, the mean power consumption, in order thereby to regulate the output voltage Vout.

In order to regulate the output voltage Vout to a given nominal/reference voltage Vref, a regulator 14 is present, which compares the output voltage Vout to the nominal value Vref and produces a regulating signal S14. The regulator 14 is configured, for example, as a regulator with integrating behavior (I-regulator), a regulator with proportional-integral behavior (PI-regulator), or a regulator with proportional behavior (P-regulator).

The regulating signal S14 produced by the regulator, together with the simulated current measurement signal Vc, which is generated by the measuring and regulating arrangement 20 in already explained manner, is sent to the signal generating circuit 40, which uses these two signals Vc, S14 to generate the pulse-width-modulated actuating signal S1.

Figure 2:
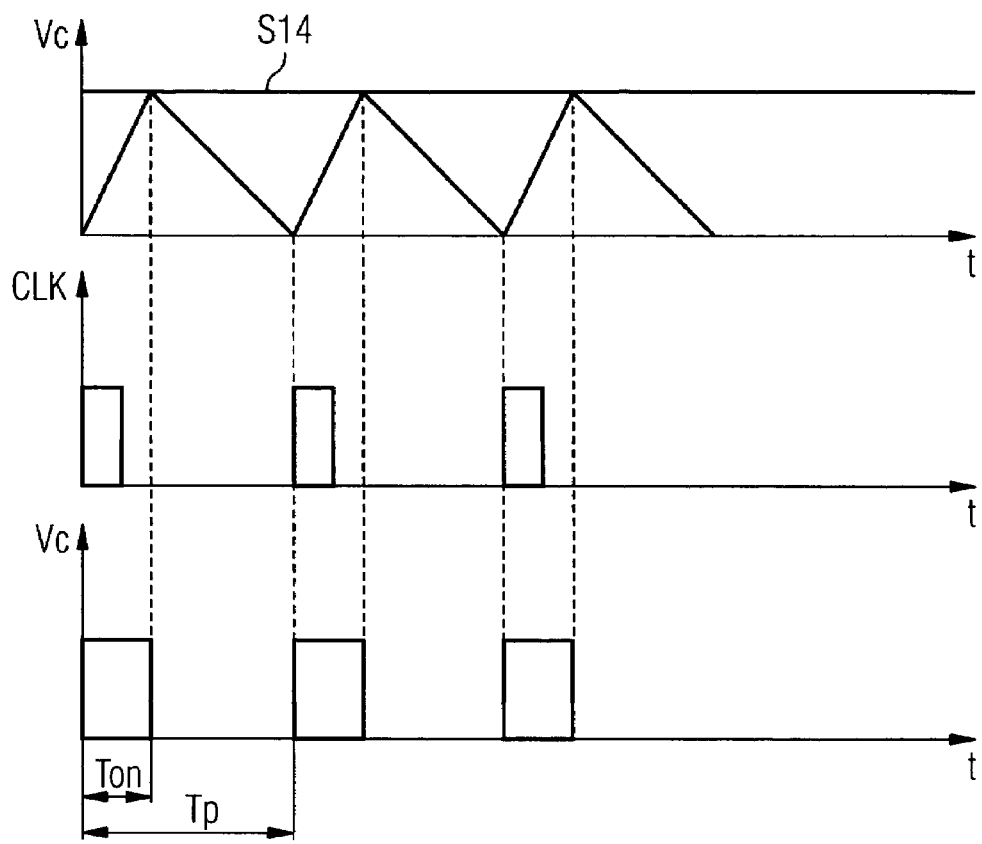
FIG. 2 illustrates exemplary time plots of the simulated current measurement signal and of a regulating signal depending on the output voltage, a clock signal, and an actuating signal formed from these signals.

The pulse width modulator 40 generates the actuating signal S1 (referring to FIG. 2) in such a way that the actuating signal S1 assumes an on-level during the pulse of a clock signal CLK, by which the first switch T1 is switched on. When the first switch T1 is switched on, the current through the inductance Lout, and accordingly the current measurement signal Vc, increase. The actuating signal switches from the on-level, or the high level in the example, to an off-level, or a low level in the example, when the current measurement signal Vc reaches the level of the regulating signal S14.

As is immediately apparent, the on-period Ton and, thus, the duty cycle of the actuating signal S1 varies with the regulating signal S14. If the regulating signal rises, other parameters being equal, then the on-period per actuation period is longer and the power consumption increases. Furthermore, by making use of the measurement signal Vc, proportional to the current Iout through the inductance Lout, the regulating process can take into account changes in the input voltage Vin. If the input voltage Vin increases, shorter on-periods are sufficient to achieve a given power consumption—dictated by the load and the nominal value of the output voltage. Since the inductance current Iout according to (1a) rises with increasing input voltage Vin, the measurement signal reaches the value of the regulating signal S14 more quickly when the input voltage Vin is greater, which automatically produces a shortening of the on-period Ton.

For the generating of the simulated current measurement signal Vc, which is at least approximately proportional to the current Iout through the inductance, use is made of the fact that this current Iout has a triangular-shaped function, in which the slope of rising edges when the first switch T1 is switched on depends according to (1a) on the difference between the input and the output voltage Vin, Vout, and where the slope of falling edges when the first switch T1 is switched off depends according to (1b) on the output voltage Vout. Instead of measuring the current across the inductance Lout permanently during the entire actuation period of the actuating signal S1, which is especially difficult because the potential at the connection of the inductance opposite the output terminal OUT fluctuates between the power supply potential Vin and the reference potential GND, the current measuring arrangement 20 forms the current measurement signal Vc from the input voltage Vin, the output voltage Vout, and at least one sampled value of the current across the inductance or one sampled value of an actual current measurement signal.

The input voltage Vin and the output voltage Vout can be easily measured in a switching converter. It is also easily possible to determine a sampled value of the current Iout across the inductance Lout during an actuation period as compared to determining the current Iout during the entire period. The current across the inductance Iout can be easily determined during the on-period or during the off-period, whereas a measurement during the entire period is significantly more difficult. In order to provide a sampled value of the inductance current Iout during an actuation period of the switch, it is sufficient to provide a current measuring arrangement that produces a current measurement signal proportional to the current Iout across the inductance Lout either during the on-period or during the off-period, and to sample this current measurement signal once per actuation period.

In the example according to FIG. 1, the current across the inductance Lout is detected during an off-period of the first switch T1, that is, during the freewheeling time, during which a current is flowing through the freewheeling element T2. The current is detected by a current measurement arrangement 11 connected in series to the freewheeling element T2, which produces a current measurement signal Vs proportional to the current across the inductance during the off-period.

Figure 3:
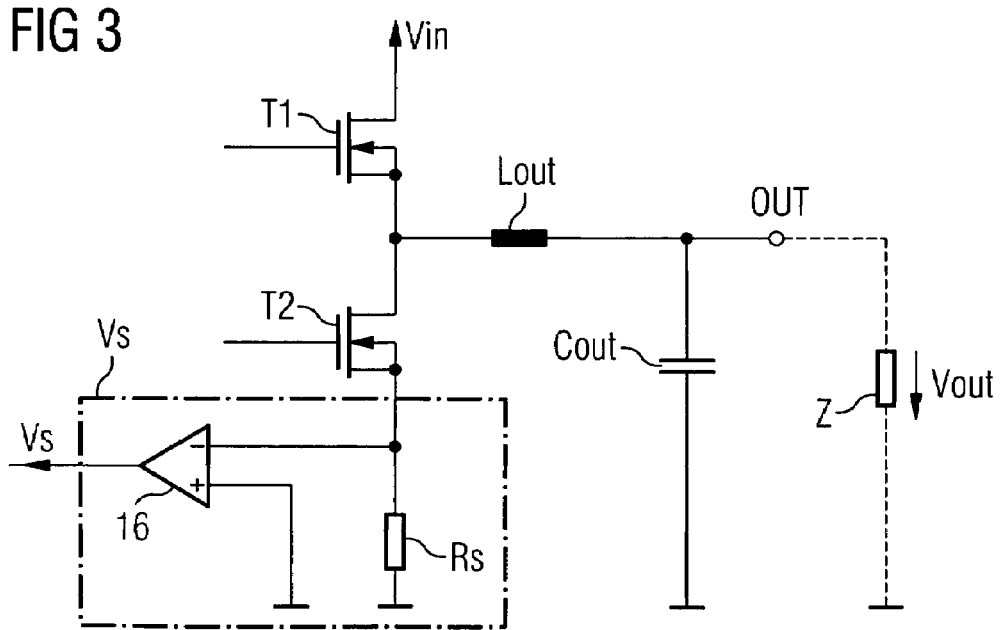
FIG. 3 illustrates an exemplary embodiment of a measuring unit detecting the current across the inductive storage element intermittently.

This current measuring arrangement 11 (referring to FIG. 3) includes, for example, a measuring resistor Rs switched in series with the freewheeling element T2 and a measuring amplifier 16 connected to the measuring resistor, which produces, from a voltage drop across the measuring resistor Rs, the measurement signal Vs, which is sent to the measuring and regulating arrangement 20.

The exemplary embodiment of the measuring and regulating arrangement depicted in FIG. 1 has, for the purpose of simulating the inductance current Iout and producing the simulated current measurement signal Vc, a capacitive storage element C, from which the simulated current measurement signal Vc can be picked off. This capacitive storage element is connected to a regulated charging and discharging circuit, which provides a charging current Ic or a discharging current Id for the capacitive storage element C depending on the actuating signal S1.

This charging and discharging circuit has a first voltage-controlled current source 21, which provides a current I21 proportional to the difference between the input voltage Vin and the output voltage Vout, and the charging and discharging circuit has a second voltage-controlled current source 22, which provides a current I22 proportional to the output voltage Vout. Voltage-controlled current sources are sufficiently well known for a detailed discussion as to their layout and functioning to be unnecessary here.

The first voltage-controlled current source 21 is part of a charging circuit, which is actuated by the pulse-width-modulated actuating signal S1 and charges the capacitive storage element when the first switch T1 is gated in conducting mode. For this, the charging circuit is connected between a terminal for power supply potential Vcc and the capacitive storage element C and it has a switch 25 actuated by the actuating signal S1, which enables a current to flow to the capacitive storage element C when the actuating signal S1 adopts a level at which the first switch T1 is gated in conducting mode. The charging circuit, furthermore, includes a current amplifier 23, which amplifies the current delivered by the first voltage-controlled current source with a regulating signal value S29 produced by a regulating circuit 29. For simplicity of representation, this current amplifier 23 is depicted as a multiplier, which is connected in the current path between the current source 21 and the capacitive storage element.

In a manner not further described, a multiplication of the current I21 provided by the voltage-controlled current source 21 with the regulating signal value S29 is of course tantamount to a multiplication of the control signal furnished to the current source 21, being proportional to the difference between input voltage Vin and output voltage Vout, with the regulating signal value S29. In this case, a multiplier is not connected in the current path between the current source 21 and the capacitive storage element C, but instead is connected ahead of the control input of the current source 21 (not shown).

A charging current provided by the explained charging circuit is designated in FIG. 1 by the reference symbol Ic.

The second voltage-controlled current source 22 is part of a discharge circuit, which is activated by the pulse-width-modulated actuating signal S1 and discharges the capacitive storage element C when the first switch T1 is gated in blocking mode. For this, the discharge circuit is connected between the capacitive storage element C and a terminal for reference potential GND and it has a switch 26, which allows a current to flow to the capacitive storage element C when the actuating signal S1 assumes a level at which the first switch T1 is gated in blocking mode. For this, this switch 26 is activated across an inverter by the actuating signal S1. The discharge circuit, furthermore, contains a current amplifier 24, which amplifies the current I22 produced by the second voltage-controlled current source 22 with the regulating signal value S29 produced by a regulating circuit 29. For simplicity of representation, this current amplifier is shown as a multiplier, which is connected in the current path between the second current source 22 and the capacitive storage element C.

In a manner not described in further detail, a multiplication of the current I22 delivered by the voltage-controlled current source 22 with the regulating signal value S29 is of course tantamount to a multiplication of the control signal furnished to the current source 22, which is proportional to the output voltage Vout, with the regulating signal value S29. In this case, a multiplier is not connected in the current path between the current path 22 and the capacitive storage element C, but instead is connected in series with the control input of the current source 22 (not shown).

A discharging current produced by the explained discharge circuit is designated as Id in FIG. 1.

The voltage across the capacitor C and, thus, the simulated current measurement signal has a triangular function, for which during one actuation period of the actuating signal:

$$Vc(t)=V0-\Delta V/2+mC1 \cdot t \text{ for } 0 \leq t \leq Ton \quad (2a)$$

$$Vc(t)=V0+\Delta V/2-mC2 \cdot (t-Ton) \text{ for } Ton \leq t \leq Toff \quad (2b).$$

Here, V0 is the instantaneous mean value of the voltage across the capacitive storage element C and $\Delta V$ is the amplitude of the triangular function during the actuation period. Furthermore:

$$mC1=Ic/C=k \cdot (Vin-Vout)/C \quad (3a)$$

$$mC2=Id/C=k \cdot Vout/C \quad (3b).$$

Here, k designates the proportionality factor between the charging current Ic and the difference between the input voltage and output voltage Vin−Vout and the proportionality factor between the discharging current Id and the output voltage Vout.

To simplify the further discussion, it is assumed that the proportionality factor k corresponds in magnitude to the instantaneous value of the regulating signal value S29. The proportionality factors between the current I21 of the first current source 21 and the input voltage/output voltage difference Vin−Vout and between the current I22 of the second current source 22 and the output voltage Vout are then equal 1 ampere/volt. The time plot of the simulated current measurement signal Vc during an actuation period of the actuating signal is illustrated in FIG. 4b.

The purpose of the measuring and regulating arrangement is to adjust this time function so that it is proportional to the time function of the current across the inductance Iout. For the time function represented in FIG. 4a for this current Iout during one actuation period of the switch, taking into account the relationships (1a), we have:

$$Iout(t)=I0-\Delta I/2+mL1 \cdot t \text{ for } 0 \leq t \leq Ton \quad (4a)$$

$$Iout(t)=I0+\Delta I/2-mL2 \cdot (t-Ton) \text{ for } Ton \leq t \leq Ton \quad (4b),$$

Where $$mL1=(Vin-Vout)/L \quad (5a)$$

$$mL2=Vout/L \quad (5b)$$

I0 here is the instantaneous mean value of the current and $\Delta I$ is the amplitude of the triangular-shaped function of the current Iout during the actuation period under consideration.

A comparison of equations (2a) and (4a), as well as (2b) and (4b), shows that, under ideal conditions, that is, an exact determination of the input and the output voltage Vin, Vout, disregarding second-order effects in the inductance Lout, disregarding leakage currents in the capacitive storage element C, and disregarding further spurious effects, the simulated current measurement signal Vc follows the current across the inductance Iout and is proportional to this current Iout. For the ratio between the simulated current measurement signal Vc and the inductance current Iout during the rising edge we have:

$$Iout(t)/Vc(t)=mL1/mC1=C/(L \cdot k) \quad (6a)$$

and during the falling edge $$Iout(t)/Vc(t)=mL2/mC2=C/(L \cdot k) \quad (6b)$$

Under real, that is, not ideal conditions, the above-mentioned effects cannot be disregarded. Furthermore, the value of the externally connected inductance Lout in the current measuring arrangement 20 is not known—unlike the capacitance value of the capacitive storage element C, which can be adjusted exactly when designing the circuit.

In order for the current measurement signal Vc to exactly mimic the variation in the inductance current Iout despite the mentioned spurious effects and in order to produce the current measurement signal Vc in a known relationship to the inductance current Iout despite the unknown value of the inductance Lout, the current measuring arrangement 20 has a loop with the regulating signal circuit 29. The purpose of this regulating arrangement is to control the gain of the amplification arrangements 23, 24 of the charging and discharging circuits so that the proportionality factor between the simulated current measurement signal Vc and the inductance current Iout corresponds to the proportionality factor between the actually measured current measurement signal Vs and the inductance current Iout. For the example depicted, using a measurement arrangement according to FIG. 3 to generate the actual measurement signal, we have:

$$Vc(t)=Ai \cdot Rs \cdot Iout(t), \quad (7)$$

where Ai is the gain of the amplifier 16 and Rs is the value of the measuring resistor. In other words: The measuring and regulating arrangement 20 with the regulating circuit 29 produces the simulated measurement signal in such a way that it extrapolates, over the entire actuation period, the measurement signal Vs present only during the off-period, which in the extreme case need be present only at one instant during the actuation period.

For this, the regulating signal circuit 29, which establishes, via the regulating signal S29, the proportionality factor between the charging current Ic and the input voltage/output voltage difference Vin–Vout and the proportionality factor between the discharging current Id and the output voltage, receives a first sampled signal Vs(k) and a second sampled signal Vc(k). The first sampled signal Vs(k) corresponds to a sampled value of the current measurement signal Vs at a given time during a period of the actuating signal S1, and the second sampled signal corresponds to a sampled value of the simulated current measurement signal Vc during the same sampling time of the actuation period. In order to sample the current measurement signal Vs, a first sampling device 27 is provided, which produces the first sampled signal Vs(k), and for the sampling of the simulated current measurement signal Vc there is provided a second sampling device 28, which produces the second sampled signal Vc(k). The sampling is done in accordance with the actuating signal S1 each time at a given moment within an actuation period, for example, a given interval after the start of the on-period or after the start of the off-period.

The regulating signal circuit 29 is configured so as to update the regulating signal S29 at the start of each actuation period of the actuating signal, by multiplying a regulating signal value S29(k) present during a k-th actuation period with the quotient of the first and second sampled value, in order to form a regulating signal value S29 (k+1) for the following k+1-th actuation period. Thus:

$$S29(k+1)=S29(k)\cdot(Vs(k)/Vc(k)) \tag{8}$$

Figure 5:
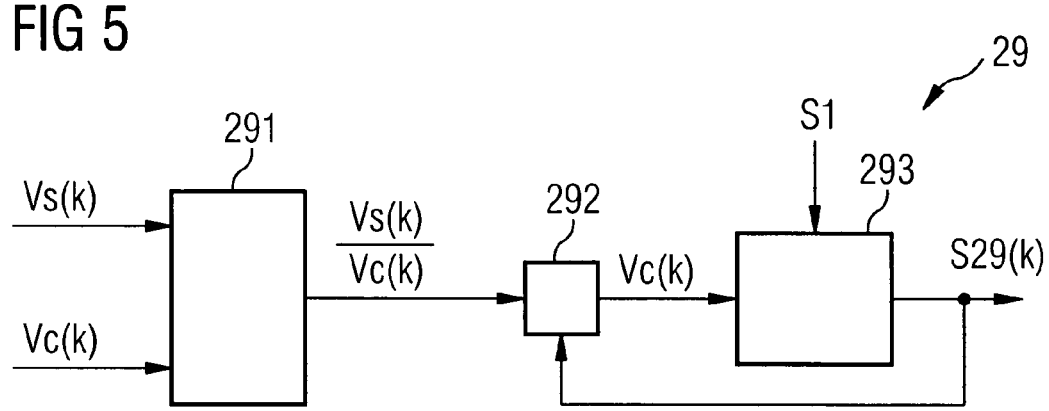
FIG. 5 illustrates a first exemplary embodiment of a regulating circuit that produces a regulating signal, present in the measuring and regulating arrangement.

An exemplary embodiment of such a regulating signal circuit 29 is illustrated in FIG. 5. The regulating signal circuit 29 includes a divider 291, which receives the first and second sampled value Vs(k), Vc(k), and outputs the quotient Vs(k)/Vc(k) of these two sampled values. The regulating signal circuit 29, furthermore, includes a storage, which outputs the instantaneous regulating signal value S29(k). This instantaneous regulating signal value is fed back to an input of a multiplier 292, the other input of which receives the quotient Vs(k)/Vc(k). The signal value Vs(k)/Vc(k)·S29 (k) present at the output of the multiplier is furnished to an input of the storage, in order to update the stored value once per actuation period. The updating of this value in the storage 293 occurs, for example, in accordance with the actuating signal S1 at the start of each actuation period. Instead of the actuating signal S1, a clock signal dictating the cycle of the actuating signal S1, such as a clock signal CLK explained in connection with FIG. 2, could of course also be used to update the storage.

The mode of functioning of the mentioned regulating arrangement will now be explained by means of FIG. 6, which illustrates the time functions of the simulated current measurement signal Vc(t) and the actual current measurement signal Vs(t) during one actuation period. In the example illustrated, it is assumed that the initial values of the two signals are equal at the start of the actuation period Tp. Such an equality of initial values can be accomplished by a calibration step, to be explained further on by means of FIG. 7.

Figure 6:
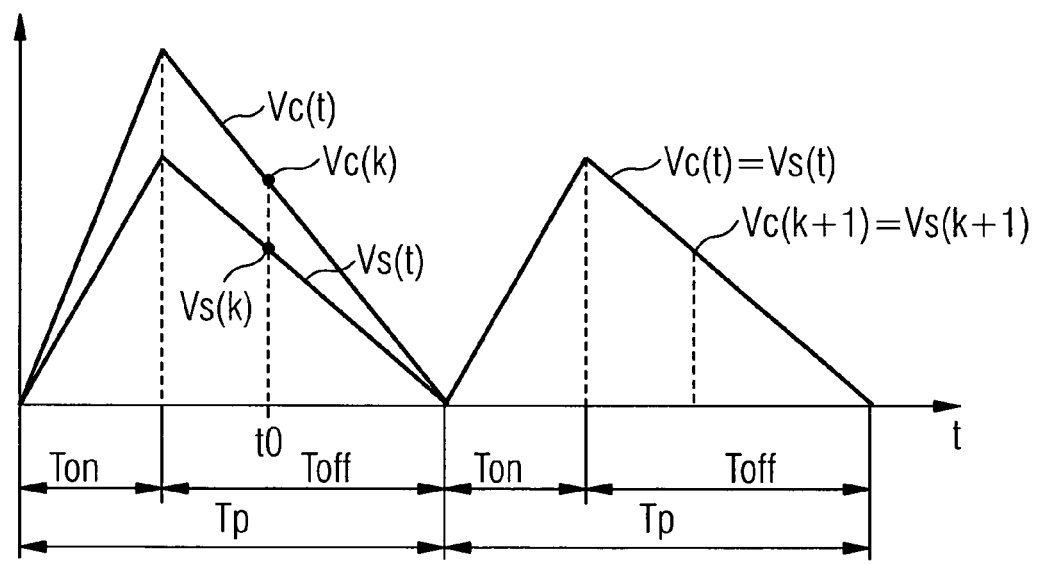
FIG. 6 illustrates the functioning of the regulating circuit by means of time plots of the current across the inductive storage element and the simulated current measurement signal during consecutive actuation periods of the switch.

The signal Vs(t) in FIG. 6 represents a signal proportional to the inductance current Iout according to relation (7), which corresponds for a segment—during the off-period Toff in the example—to the signal produced by the measurement arrangement 11. The slope of the two signals Vc(t), Vs(t) is proportional during the on-period Ton to the input voltage/output voltage difference Vin–Vout, while the slope during the off-period Toff is proportional to the output voltage Vout. Contrary to the desired effect, the simulated regulating signal Vc(t) in the example at first rises more steeply than the actual measurement signal Vs(t) and accordingly drops more steeply, that is, the proportionality factor between the input/output voltage difference Vin–Vout and the charging current Ic and between the output voltage Vout and the discharging current Id is not adjusted to the desired value. In order to accomplish this, sampled values of the simulated signal Vc(t) and the measurement signal Vs(t) are determined at any given time t0 during the actuation period. For these sampled values, we have:

$$Vs(k)=Vs(t0)=Ai\cdot Rs\cdot Iout(t0)=Ai\cdot Rs/Lout\cdot[(Vin-Vout)\cdot Ton-Vout\cdot(t0-Ton)] \tag{9}$$

$$Vc(k)=Vc(t0)=Ic\cdot Ton-Id\cdot(t0-Ton)=S29(k)/C\cdot[(Vin-Vout)\cdot Ton-Vout\cdot(t0-Ton)] \tag{10}$$

For the quotient of the two sampled values, we have:

$$Vs(k)/Vc(k)=Ai\cdot Rs\cdot C/(Lout\cdot S29(k)) \tag{11}$$

This quotient during the first period represented in FIG. 5 is not equal to unity; in the special case, it is less than unity. The desired goal, namely, identical time functions of the simulated measurement signal Vc(t) and the measured signal, is achieved if, during the next period, Vs(k+1)=Vc(k+1), that is, if:

$$Vs(k+1)/Vc(k+1)=Ai\cdot Rs\cdot C/(Lout\cdot S29(k+1))=1 \tag{12}.$$

This is accomplished if, during the next period K+1, we have for the regulating signal value S29(k+1):

$$S29(k+1)=S29(k)\cdot Vs(k)/Vc(k) \tag{13}.$$

It should be pointed out that the sampling of the time functions of the two signals Vs(t), Vc(t) can occur at any given time during an actuation period. In the example, a sampling occurs during the falling edge, because the measurement arrangement 11 according to FIG. 11 is configured to generate the measurement signal Vs only during the falling edge, so that only during the falling edge is a comparison value available for the simulated measurement signal Vc.

The simulated measurement signal Vc in the above-explained example is generated such that its time function follows a measurement signal Vs obtained by multiplying the inductance current Iout with the factor Ai·Rs. Such a measurement signal is furnished by the measurement arrangement 11 during the off-period in the example of FIG. 1. This proportionality factor is dependent on the parameters of the measurement arrangement. If a different proportionality factor should be desired, the possibility exists of connecting an amplifier between the regulating arrangement 29 and the charging and discharging circuit.

The regulating of the proportionality factor as explained above according to FIG. 6 in order to adjust the charging and discharging currents Ic, Id functions when the measurement voltage Vs and the simulated measurement voltage Vc have identical d.c. signal components. In order to adjust such identical d.c. signal components at the start of the further regulation process, the current measurement arrangement has a calibration arrangement, which is configured so as to supply a calibration current Iadj to the capacitive storage element. The sequence of such a calibration process is explained hereinbelow with reference to FIG. 7.

Figure 7:
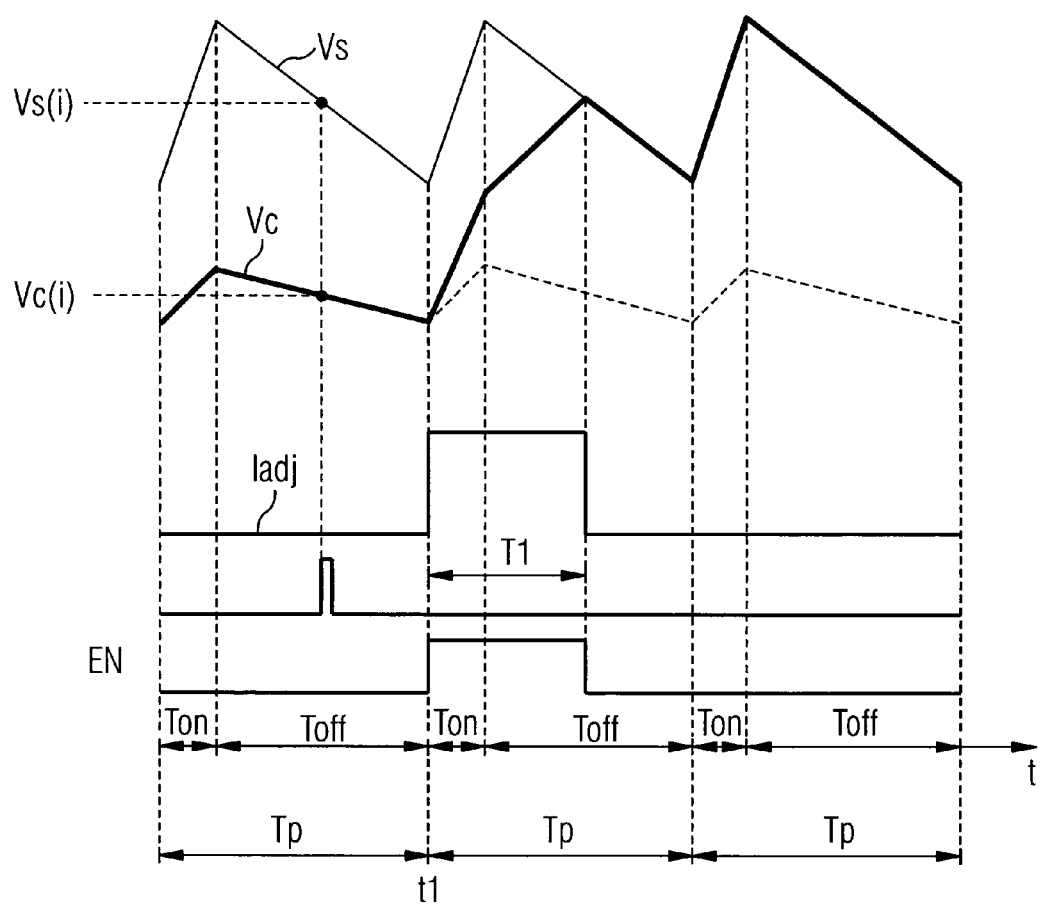
FIG. 7 illustrates the functioning of a calibration circuit, present in the measuring and regulating arrangement, by means of time plots of the simulated current measurement signal, of a signal proportional to the current across the inductive storage element, and of a calibration current.

FIG. 7 illustrates the time functions of a signal Vs proportional to the inductance current, the simulated measurement signal Vc before, during, and after the calibration process, and the time function of a calibration current during the calibration process.

Prior to the calibration, which starts at a time t1 with the start of an actuation period, the time functions of the signal Vs proportional to the inductance current, which corresponds for a segment to the signal generated by the measurement arrangement 11, and the simulated signal Vc have different d.c. signal components, which make it difficult or impossible to adapt the time function of the simulated signal Vc to the time function of the signal Vs by merely changing the charging and discharging currents. The calibration current Iadj flowing during the calibration is used to adapt the d.c. signal component of the simulated signal Vc to the d.c. signal component of the signal Vs.

In order to produce the calibration current Iadj, during an actuation period, before the start of the calibration process, at a predetermined sampling time within this actuation period, one determines sampled values of the measurement signal Vs and the simulated signal Vc, which are designated hereinbelow as Vs(i) and Vc(i). The calibration current Iadj during the following period is now generated so that, at a time within this actuation period that corresponds to the sampling time within the preceding period, the measurement signal Vs corresponds to the simulated signal, so that: Vs(i+1)=Vc(i+1). If the charging current Ic is at first unchanged and the discharging current is at first unchanged, and the duty cycle remains the same, we must have:

$$Vc(n)+Iadj/C \cdot T1 = Vs(i+1) \quad (14).$$

Here, T1 is the time interval between the start of the actuation period and the time of the sampling. If the duty cycle of the actuating signal remains the same and the input and output voltages Vin, Vout are assumed to be constant, the time function of the measurement signal during the calibration period corresponds to the time function before the calibration period, so that Vs(i+1)=Vs(i). We then have for the charging current:

$$Iadj = C/T1 \cdot (Vs(i)-Vc(i)) \quad (15).$$

The calibration current Iadj is thus dependent on the difference between the sampled values Vs(i), Vc(i) and is generated in the layout according to FIG. 1 by a transconductance amplifier (OTA) 31, whose input receives the two sampled values, and which has the desired gain factor, which according to (15) is dependent on the known capacitance value of the capacitive storage element C and the known time position of the sampling time within the actuation period.

In one case, during the calibration, the duty cycle of the actuating signal S1 is constant during the calibration phase. The calibration phase will include at least the period before the actual calibration, during which the sampled values Vs(i), Vc(i) are determined (which corresponds to the period before time t1 in FIG. 7), and the actuation period during which the calibration current Iadj flows (corresponding to the period after the time t1 in FIG. 7).

In order for the simulated signal Vc to follow the measurement signal after the end of the calibration current Iadj, an adjustment of the charging and discharging current Ic, Id is necessary after applying the calibration has stopped. The required steps for adjusting the charging and discharging currents Ic, Id are explained in the following:

The sampled values Vc(i) and Vc(i) obtained by sampling Vs and Vc signal are stored, for example in the sampling units 27, 28 of FIG. 1. These sampling values are used for calculating the difference Vs(i)–Vc(i) which is required for calculating the adjustment current Iadj in the OTA. The OTA 31 has a gain factor (gm) equal to gm=C/T1, where C is the capacitor used for the current reconstruction and T1 is the time dedicated to the d.c. offset recovery.

Before the calibration current Iadj is applied the charge and discharge currents are not updated, that is there is a fixed proportional factor between the charge current Ic and the input-output voltage difference Vin–Vout and the same fixed proportional factor between the discharge current and the output voltage starting with the time, when the voltage across the capacitor is zero and the current through the inductor is zero. Assuming the system is in steady state during the calibration period, that is the d.c. offset between Vc and Vs is the same during the period when Vs(i) and Vc(i) are obtained and at the beginning of the period when the calibration current is applied. The reconstructed signal Vc in this case follows the signal Vc after the charge and discharge currents are updated in accordance with (13), that is:

$$Ic(k+1) = Vs(i)/Vc(i) * Ic(k), \quad (16a)$$

$$Id(k+1) = Vs(i)/Vc(i) * Id(k) \quad (16b)$$

at the time, when the calibration current Iadj turns zero. Starting from then, the charge and discharge currents are updated each cycle using the sample values of both signals Vs and Vc.

Summarizing the above it is relevant for the proportional factor between the charge current Ic and the input-output voltage difference Vib–Vout and for the proportional factor between the discharge current Id and the output voltage Vout not to be updated until the d.c. offset difference between Vs and Vc is equalized using the adjustment current Iadj. A first update of the charge and discharge currents Ic, Id, and the regulation signal S29 respectively, is then performed after the d.c. offset has been equalized. After having equalized said d.c. offset the charge and discharge currents Ic, Id are updated with each cycle.

The controlling of the calibration process occurs (see FIG. 1) via a control circuit 32, which enables the generating of the calibration current Iadj by the amplifier 31 via an enabling signal EN, which is likewise represented in FIG. 7. This control circuit 32 also controls the pulse width modulator 40 via another control signal S32, so as to bring about the generating of an actuating signal S1 with a constant duty cycle during the calibration phase.

Figure 8:
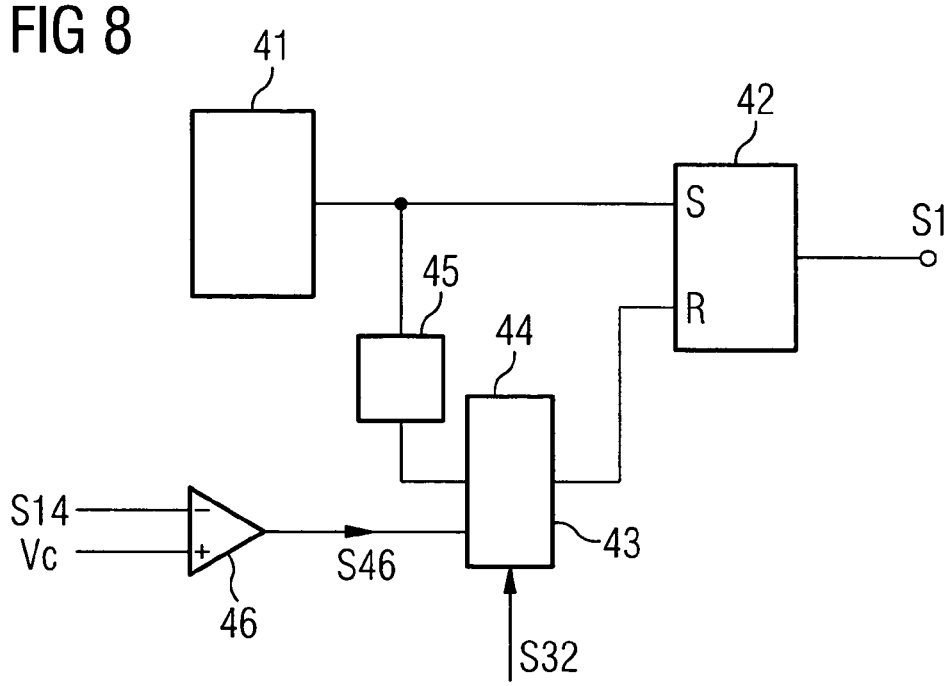
FIG. 8 illustrates an exemplary embodiment of a signal generating circuit present in the actuation circuit, which provides the actuating signal.

Referring to FIG. 8, the pulse width modulator 40 has, for example, a clock generator 41, which produces a clock signal CLK, specifying the start of the on-periods of the actuating signal S1 and, thus, the cycle of the actuating signal S1. This clock signal CLK is furnished to the set input of a RS flip-flop, whose output Q produces the actuating signal S1. A resetting of the flip-flop 42, and thus the generating of an off-level, occurs during normal operation after the calibration is complete, dependent on a comparing of the simulated measurement signal Vc and the regulating signal S14. For the comparing of these two signals, there is a comparator 56, whose output signal S46 resets the flip-flop 42 during normal operation. For switching between calibration mode and normal operation, there is a multiplexer 44, which is actuated by the control signal S32 of the control circuit 32 and which furnishes the comparator signal S46 to the reset input of the flip-flop 42 during normal operation. In order to accomplish a constant duty cycle during calibration mode, a delay element 45 is provided, which receives the clock signal CLK and whose output signal is furnished to the reset input of the flip-flop 42 during calibration mode. The length of the delay of this delay element determines a constant on-period Ton during calibration mode and, thus, a constant duty cycle.

Figure 9:
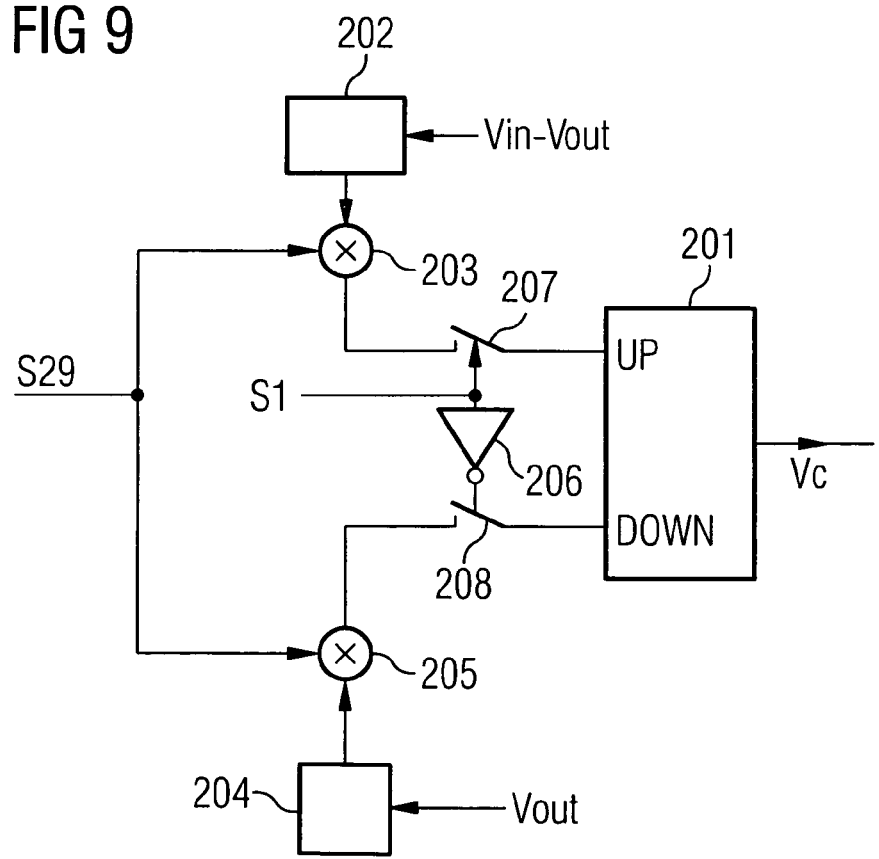
FIG. 9 illustrates a digitally implemented circuit for furnishing a simulated current measurement signal.

As an alternative to generating the simulated signal Vc as an analog signal, this simulated signal can also be produced as a digital signal (see FIG. 9). The capacitive storage element according to FIG. 1 is replaced here by a digital counter 201, which outputs the simulated measurement Vc in the form of a digital numerical value. The counter has a first clock input for incrementing the count and a second input for decrementing the count. The current sources according to FIG. 1 are replaced in this embodiment by a first and second voltage-controlled oscillator (VCO) 202, 204, which have first and second clock signals for incrementing and decrementing the count. The clock signals of the voltage-controlled oscillators are furnished to frequency multipliers, which multiply the clock frequency with the preferably likewise digitally produced regulating signal S29.

The frequency-multiplied clock signal of the first oscillator 202, whose frequency is proportional to the input voltage/output voltage difference Vin–Vout, is furnished to the increment input during the on-period of the actuating signal S1 via a first switch 207, activated by the actuating signal S1. The frequency-multiplied clock signal of the second oscillator 204, whose frequency is proportional to the output voltage Vout, is furnished to the decrement input during the off-period of the actuating signal S1 via a second switch 208, activated by the inverted actuating signal S1.

Both the counter 201 and the previously explained capacitive storage element are part of a triangular signal generating circuit, which simulates the triangular current across the inductance Lout.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An actuation circuit for a switch element regulating the power consumption of an inductive energy storage element in a switching converter, used to convert an input voltage into an output voltage, the circuit comprising:
   a pulse width modulator circuit configured to provide a pulse-width-modulated actuating signal for the switch element depending on a regulating signal dependent on the output voltage and a current measurement signal dependent on a current across the inductive storage element; and
   an arrangement configured to provide the current measurement signal;
   wherein the arrangement is a measuring and regulating arrangement, configured to simulate the current measurement signal from a signal dependent on the output voltage, a signal dependent on the difference between the input voltage and the output voltage, and at least a first sampled value of a signal proportional to the current across the inductive storage element during a period of the pulse-width-modulated actuating signal.

2. The actuation circuit of claim 1, wherein the measuring and regulating arrangement comprises:
   a triangular signal generating circuit controlled by the actuating signal, which produces the simulated current measurement signal and which is configured to generate the simulated signal such that its time change during an on-period of the actuating signal is proportional via a proportionality factor to the difference between the input voltage and the output voltage and, during an off-period, is proportional via the proportionality factor to the output voltage; and
   a regulating arrangement, which receives during an actuation period at least one sampled value of a signal proportional to the current across the inductance and at least one sampled value of the simulated current measurement signal and which produces a regulating signal, dependent on the sampled values, that is furnished to the triangular signal generating circuit and used to adjust the proportionality factor.

3. The actuation circuit of claim 2, wherein the regulating signal generating circuit produces the regulating signal such that:

$$S29(k+1)=S29(k)\cdot(Vs(k)/Vc(k)),$$

where S29(k) designates the regulating signal value during a first actuation period, Vs(k) is the sampled value of the signal proportional to the current across the inductance during the first actuation period, Vc(k) is the sampled value of the simulated signal during the first actuation period, and S29(k+1) is the regulating signal value during an actuation period following the first actuation period.

4. The actuation circuit of claim 1, further including a current measurement arrangement for providing the signal proportional to the current across the inductive storage element.

5. The actuation circuit of claim 4, wherein the current measurement arrangement is configured so as to generate the signal proportional to the current across the inductive storage element only during an on-period of the actuating signal.

6. The actuation circuit of claim 4, wherein the current measurement arrangement is configured so as to generate the signal proportional to the current across the inductive storage element only during an off-period of the actuating signal.

7. The actuation circuit of claim 2, wherein the triangular signal generator circuit further comprises:
   a capacitive storage element, from which the simulated signal can be picked off; and
   a charging and discharging circuit connected to the capacitive storage element that charges the capacitive storage element in accordance with the pulse-width-modulated actuating signal with a charging current that is at least approximately proportional to the difference between the input voltage and the output voltage and to the regulating signal.

8. The actuation circuit of claim 7, wherein the charging and discharging circuit discharges the capacitive storage element with a discharging current at least approximately proportional to the output voltage and the regulating signal.

9. The actuation circuit of claim 8, wherein the charging and discharging circuit further comprises a charging circuit for producing a charging current proportional to the difference between the input voltage and the output voltage and to the regulating signal and a first switch connected in a current path of the charging circuit and the capacitive storage element and activated by the actuating signal.

10. The actuation circuit of claim 8, wherein the charging and discharging circuit further comprises a discharging circuit for producing a discharging current proportional to the output voltage and to the regulating signal and a second switch, connected in a current path of the discharge circuit and the capacitive storage element and activated in complementary fashion to the first switch.

11. The actuation circuit of claim 7, further comprising a calibration circuit coupled to the capacitive storage element, which produces a calibration current for the capacitive storage element in accordance with a calibration signal.

12. The actuation circuit of claim 1, wherein the pulse width modulator circuit is configured so as to produce an actuating signal during a calibration process with a constant duty cycle independent of the regulating signal.

13. The actuation circuit of claim 11, wherein the calibration current is dependent on the difference between the first and second sampled value, the capacitance value of the capacitive storage element, and the period of the calibration signal.

14. The actuation circuit of claim 2, wherein the triangular signal generator circuit further comprises:
- a counter with an output that produces a count, representing the simulated current measurement signal, with a first input to receive a signal incrementing the count and with a second input receiving a signal decrementing the count;
- an incrementing circuit, that is coupled to the first input of the counter and that produces a clocked incrementing signal with a frequency proportional to the difference between the input voltage and the output voltage and to the regulating signal;
- a decrementing circuit that is coupled to the second input of the counter and that produces a clocked decrementing signal with a frequency proportional to the output voltage and to the regulating signal; and
- a switch arrangement that furnishes the incrementing signal and the decrementing signal to the first and second input of the counter in accordance with the actuating signal.

15. The actuation circuit of claim 14, wherein the incrementing circuit has a first voltage-controlled oscillator, that receives a signal dependent on the difference between the input voltage and the output voltage, and wherein the decrementing circuit has a second voltage-controlled oscillator, which receives a signal dependent on the output voltage.

16. The actuation circuit of claim 15, wherein frequency multipliers receiving the regulating signal are connected between the voltage-controlled oscillators and the inputs of the counter.

17. An actuation circuit for a switch element in a switching converter used to convert an input voltage to an output voltage comprising:

modulation means for providing a pulse-width modulated actuating signal for the switch element depending on a regulating signal dependent on the output voltage and on a current measurement signal dependent on a current across an inductive storage element; and measurement and regulating means for providing a measurement signal from a signal dependent on the output voltage, a signal dependent on the difference between the input voltage and the output voltage, and at least a first sampled valve of a signal proportional to the current across an inductive storage element during a period of the pulse-width modulated actuating signal.

18. The actuation circuit of claim 17, further comprising a triangular signal generating circuit controlled by the actuating signal and configured to produce the simulated current measurement signal and to generate the simulated signal such that its time change during an on-period of the actuating signal is proportional via a proportionality factor to the difference between the input voltage and the output voltage and, during an off-period, is proportional via the proportionality factor to the output voltage.

19. The actuation circuit of claim 18, further comprising a regulating arrangement, which receives during an actuation period at least one sampled value of a signal proportional to the current across the inductance and at least one sampled value of the simulated current measurement signal and which produces a regulating signal, dependent on the sampled values, that is furnished to the triangular signal generating circuit and used to adjust the proportionality factor.

20. The actuation circuit of claim 19, wherein the regulating signal generating circuit produces the regulating signal such that:

$$S29(k+1)=S29(k)\cdot(Vs(k)/Vc(k)),$$

where $S29(k)$ designates the regulating signal value during a first actuation period, $Vs(k)$ is the sampled value of the signal proportional to the current across the inductance during the first actuation period, $Vc(k)$ is the sampled value of the simulated signal during the first actuation period, and $S29(k+1)$ is the regulating signal value during an actuation period following the first actuation period.

* * * * *